United States Patent [19]

Moreau

[11] Patent Number: 4,797,250
[45] Date of Patent: Jan. 10, 1989

[54] NUCLEAR REACTOR CONFINEMENT ENCLOSURE FOUNDATION

[75] Inventor: Philippe Moreau, Neuilly, France
[73] Assignee: Framatome, Courbevoie, France
[21] Appl. No.: 87,007
[22] Filed: Aug. 19, 1987

[30] Foreign Application Priority Data

Aug. 21, 1986 [FR] France .................. 86 11946

[51] Int. Cl.$^4$ ............................. G21C 13/00
[52] U.S. Cl. ...................... 376/293; 52/226; 52/294; 376/296
[58] Field of Search ............. 376/293, 296; 52/224, 52/225, 226, 247, 294

[56] References Cited

U.S. PATENT DOCUMENTS

| | | | |
|---|---|---|---|
| 2,299,949 | 10/1942 | Crom | 52/224 |
| 3,349,524 | 10/1967 | Fistedis | 376/296 |
| 3,683,574 | 8/1972 | Vaessen | 376/296 |
| 3,893,270 | 7/1975 | Schupack et al. | 52/224 |
| 4,118,277 | 10/1978 | Schabert et al. | 376/293 |
| 4,265,066 | 5/1981 | Lin et al. | 376/296 |
| 4,328,648 | 5/1982 | Kalpins | 52/167 |
| 4,625,354 | 12/1986 | Richard | 52/226 |

FOREIGN PATENT DOCUMENTS 0128801 12/1984 European Pat. Off. .
3111645 10/1982 Fed. Rep. of Germany .
544382 12/1973 Switzerland .

Primary Examiner—Charles T. Jordan
Assistant Examiner—Richard W. Wendtland
Attorney, Agent, or Firm—Pollock, Vande Sande & Priddy

[57] ABSTRACT

Nuclear reactor confinement enclosure foundation comprising a skirt and a dome, the foundation comprising a footing in contact with the ground and which bears members and rods arranged annularly and supported on the confinement enclosure floor. The space between the footing and the floor can be used in different ways.

8 Claims, 3 Drawing Sheets

NUCLEAR REACTOR CONFINEMENT ENCLOSURE FOUNDATION

BACKGROUND OF THE INVENTION

The present invention relates to a new type of foundation for a nuclear reactor confinement enclosure.

The confinement enclosures used in the nuclear industry essentially comprise a dome surmounting a cylindrical skirt bearing on a foundation. They are formed from an inner mild steel skin, which serves to ensure the necessary sealing and which is surrounded by a concrete shell ensuring the strength of the overall assembly. The stresses undergone by the enclosure are in fact numerous and large. The foundation supports the weight of the equipment and the internal structures, such as the vessel, the steam generators, the primary circuit and the pumps. The skirt and the dome are subject to the conventional forces of civil engineering structures, such as those produced by wind, and must also be able to withstand catastrophic events, such as earthquakes and pressurized circuit fractures, which have the effect of producing a significant overpressure within the enclosure. The latter event makes it necessary for the confinement enclosure to be in tension, which is not desirable in the case of concrete. It is for this reason that numerous prestressing cables are positioned along the meridians of the dome and descend along the cylindrical skirt, the ends thereof being fixed to the periphery of the foundation.

However, this prestressing procedure causes a significant problem for the foundation and it is on the basis thereof that the present invention arises. Thus, the prestressing cables, through transmitting the internal pressure in the case of an incident, produce a vertical rising force on the periphery of the foundation, while the weight of the various installations placed on said foundation causes downward forces largely applied towards the periphery thereof. Thus, there are significant shear stresses, which must be taken up with the aid of prestressed reinforced concrete. Therefore the cost of the structure is greatly increased. Moreover, the forces caused in this way can lead to bowing or warping of the foundation, which tends to lift at its periphery, and this causes a loss of cohesion of the soil for the foundations and significantly reduced stability of the confinement enclosure. In the case of confinement enclosures with a diameter of about 50 m, the warping can be sufficient to justify the establishment of a second foundation supporting the installations located in the confinement enclosure; this is located above the first foundation and is separated therefrom by a layer of deformable materials. This clearly also leads to an increase in the construction costs.

Finally, the installation and maintenance of the ends of the prestressing cables require a significant construction volume obtained by digging out a circular ring below the actual foundation. As a result, the drainage of that part of the ground or soil located within the ring is much more difficult.

An improvement to this concept was proposed in the French Pat. No. 7533441. According to the latter, the foundation is replaced by a more complex structure comprising a lower horizontal footing, a second footing located above the first and which constituting the ground of the confinement enclosure and a certain number of vertical walls defining the space between the two footings and breaking it up into zones. The heads of the prestressing cables of the skirt and dome are consequently located between the two footings. This arrangement makes it possible to eliminate the drainage problems produced by the arrangement of a lower annular ring around the foundation, while also saving a considerble amount of space. However, the problems referred to hereinbefore concerning the poor working of the concrete in tension and bending still occur.

SUMMARY OF THE INVENTION

The present invention is intended to obviate the disadvantages of known foundations, and is more particularly directed at obtaining a foundation for a nuclear reactor confinement enclosure with planar bedding, which is stressed under better conditions due to the elimination of tensile stress and strain concentrations.

The invention therefore relates to a foundation, which comprises a horizontal concrete footing embedded in the ground, as well as two groups of oblique truncated cone-shaped or planar concrete slabs bearing on the footings supporting the confinement enclosure, the slabs of the first group being inclined towards the inside of the slab, while the prestressed slabs of a second group are inclined outwards of the slab and are positioned around the slabs of the first group and face the latter.

According to a preferred embodiment of the invention, the foundation comprises prestressing cables arranged radially in the outwardly inclined plates and in the footing, between the center of the latter and the confinement enclosure.

Another improvement to the invention consists of using a footing extending towards the outside beyond its contact perimeter with the outwardly inclined slabs, and being provided with prestressing hoops disposed along its periphery.

BRIEF DESCRIPTION OF THE DRAWINGS

The invention will now be described in greater detail by way of example with reference to the attached drawings, wherein.

DESCRIPTION OF PREFERRED EMBODIMENTS

All the drawings show axial sections of confinement enclosures assumed to have a symmetry of revolution about their axis ZZ, which is at present a conventional construction. However, it is obvious that the invention is not limited to such structures and can instead apply to more complex shapes.

Figure 1:
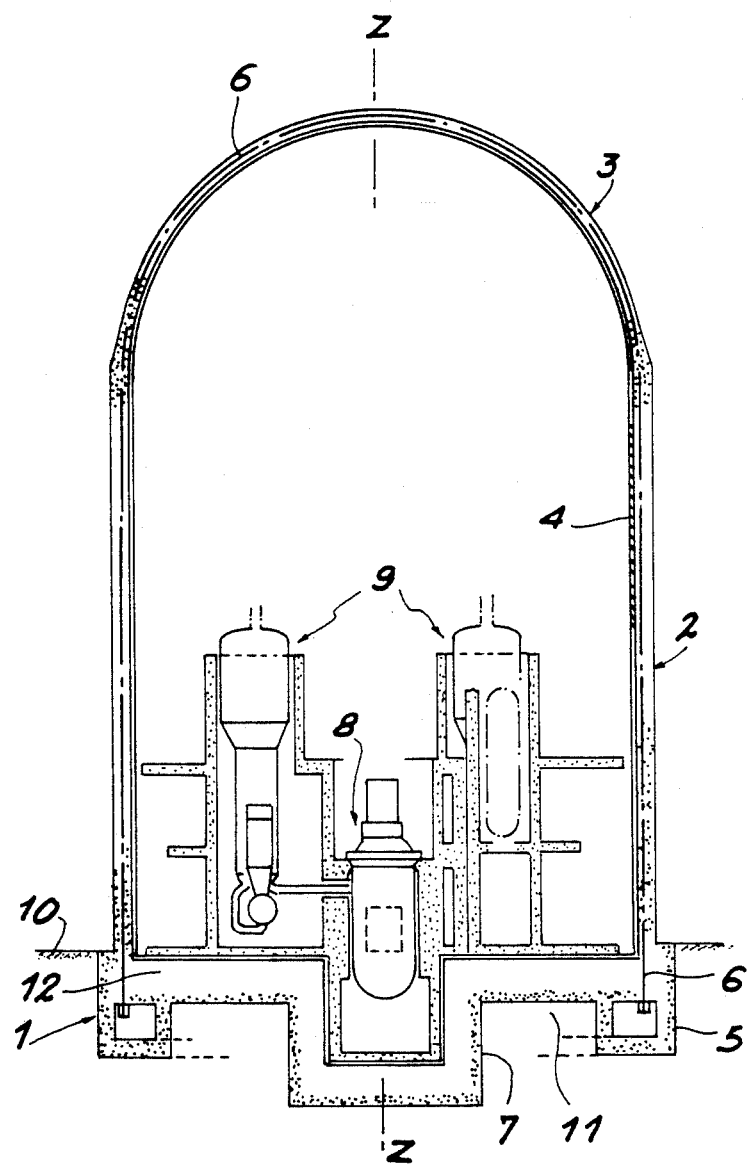
FIG. 1 shows a prior art confinement enclosure.

FIG. 1 shows a confinement enclosure having three essential parts, namely, foundation 1, skirt 2 and dome 3. Each of these parts is constituted by a concrete wall duplicated by a mild steel interior covering 4 in the interior making it possible to seal the enclosure. Foundation 1 has an irregular shape and has an annular ring 5 disposed on the inner face of its periphery and can have a central shaft 7 at least partly containing vessel 8.

The function of ring 5 is to house the ends of the prestressing cables 6, which have a generally uniform angular distribution and which pass through the entire skirt 2. As a result of said prestressing, the foundation 1, which is also subject to the weight of the structures and equipments such as the vessel 8 and generators 9, is subject to high bending and shear stresses, particularly in the part 12 thereof close to the periphery and skirt 2. Thus, the concrete must have a significant thickness, even though it is reinforced or prestressed. Another consequence is that part 11 of the ground 10 between the interior of ring 5 and the exterior of central shaft 7 is not very accessible, and draining operations are difficult.

Figure 2:
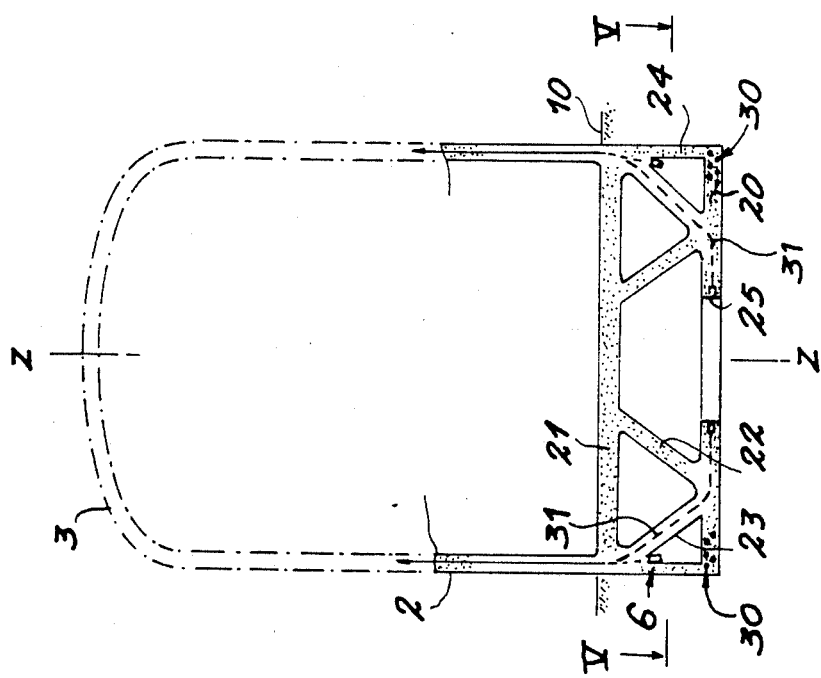
FIG. 2 shows a confinement enclosure without internal equipment according to a first embodiment of the invention.
Figure 6:
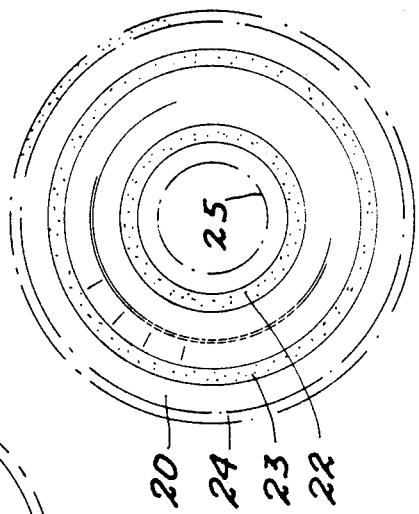
FIGS. 5 and 6 show sections along line V—V of FIG. 2 for two possible embodiments of the invention.
Figure 5:
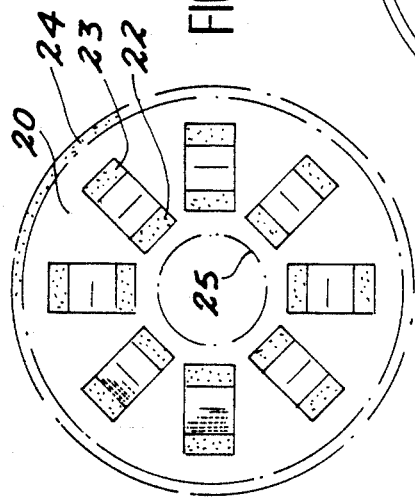

Reference will now be made to FIG. 2, which shows an embodiment of a confinement enclosure foundation according to the invention. This foundation comprises from bottom to top an annular or circular footing 20 having a lower planar surface on which bear rods 23 and members 22. The said concrete slabs are planar or truncated cone-shaped, being inclined towards the center of the footing for members 22 and towards the outside of the footing or rods 23, which are connected to skirt 2. Rods 23 face members 22 and are located outside the latter in a regular arrangement along ring 20, which can be discontinuous as shown in FIG. 5, or continuous as shown in FIG. 6. According to FIG. 2, member 22 and rod 23 have a common intersection with footing 20, which is not a necessary condition in the invention, but provides the advantage of leading to more uniform stresses on footing 20. It is also possible to see an outer wall 24, which can be incorporated into the installation so as to limit excavations around the confinement enclosure foundation.

The forces and stresses to which said structure are exposed are summarized hereinafter. By transmitting the internal pressure in the case of an incident or accident, prestressing cables 6, as in the prior art solutions, create a vertical upward force distributed over the periphery of the floor or ground of the confinement enclosure 21, whereas the weight of the various installations of the confinement enclosure is exerted in the form of a pressure on floor 21, mainly within the intersection with members 22. Thus, there are bending stresses along floor 21, mainly on the overhanging part between the prestressing cables 6 and the various weights, i.e., essentially that part of the floor 21 between the supports of members 22 and rods 23. The length of this overhang is, according to the invention, sufficiently small so that it does not produce excessive deformations of the concrete. However, the other parts of the structure are not subject to bending. The members 22 are compressed and rods 23 are also compressed due to the prestressing provided by cables 31. The vertical components of these forces tend to balance out on footing 20, which is consequently not subject to bending, because members 22 and rods 23 have a common intersection with said footing 20. The contact surface of footing 20 and floor 10 is consequently not modified, which makes it possible to guarantee the cohesion of ground or floor 10 and the stability of the confinement assembly.

Figure 3:
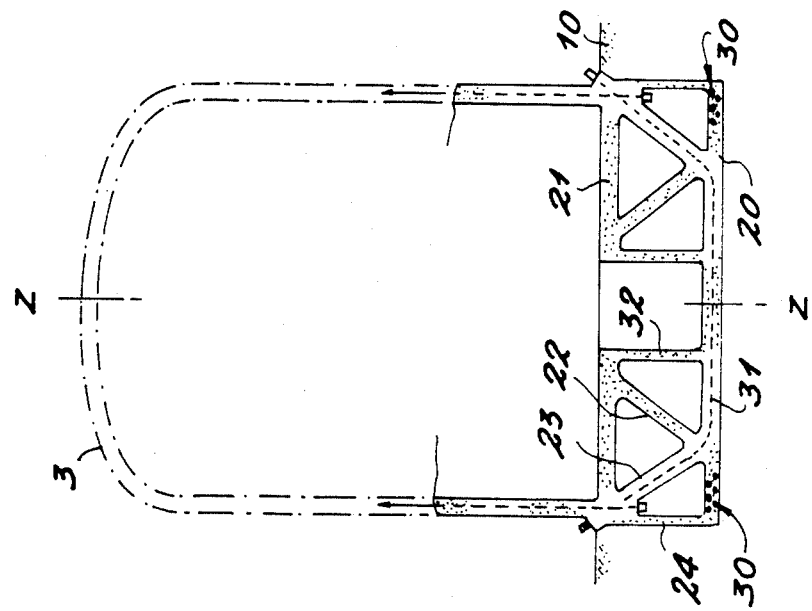
FIG. 3 shows a second embodiment of the invention.

As tensile stresses are undesirable in concrete, it is thus possible to prestress the footing 20 as well as rods 23, and this is shown in the embodiment of FIG. 3. Prestressing hoops 30 are installed on the outer periphery of footing 20, while radiating prestressing cables 31 are disposed along rods 23 and footing 20. These prestressing cables can extend over the entire diameter of footing 20 and over two opposite rods 23. In the example of an annular footing 20 shown in FIG. 2, the prestressing cables 31 are obviously shorter and then have one end of the inner contour 25 of footing 20.

FIG. 3 shows in another embodiment a central shaft located between footing 20 and ground 21 of the confinement enclosure, defined by vertical circular concrete walls 32 and issuing into the confinement enclosure. This shaft can contain the reactor vessel. Such an arrangement is known per se and is also shown in FIG. 1. However, with the charcteristic shape of the foundation according to the invention, walls 32 of said shaft are not exposed to high mechanical stresses and are not in contact with the floor or ground 10. Thus, they can have much lighter dimenioning. Moreover, footing 20 is horizontal, which permits simpler earthworks.

Figure 4:
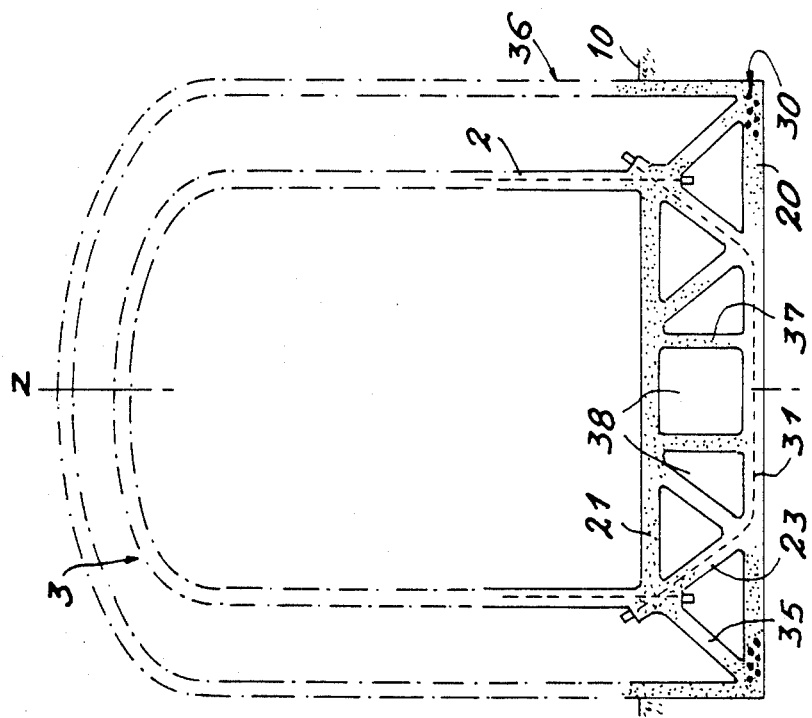
FIG. 4 shows a third embodiment of the invention.

FIG. 4 shows another embodiment of the invention, where the footing 20 projects to a considerable extent towards the outside of the confinement enclosure and can carry a second outer confinement enclosure 36, completely containing the first enclosure defined in particular by skirt 2, dome 3 and ground 21. It is then possible and advantageous to install a further row of members 35, also called external members, which contact by their lower end the footing 20 and which are preferably located at the intersection of footing 20 and the second confinement enclosure 36, while the upper end members 35 is at the intersection of rods 23 and the confinement enclosure floor 21. These outer members 35 permit a better distribution of forces and lead to increased stability of the installation.

According to FIG. 4, the space between footing 20, the confinement enclosure floor 21 and members 22 has been compartmentalized by means of vertical partitions 37 to form zones 38. This arrangement saves a large amount of space which can be used for various equipments and installations.

The embodiments described hereinbefore are of a purely exemplary nature, and the prestressng of footing 20 and rods 23, the formation of a central shaft, the compartmentalization into zones 38, the fitting of outer members 35 and the installation of a second confinement enclosure are independent of one another and can consequently be differently combined.

The advantages of the inventive foundation are a better distribution of the forces in the structure of the foundation and a footing 20 with a simpler design, because it is horizontal and not subject to bending, so that the installation is better embedded in the ground 10.

The more rational use of material makes it possible to save a large amount of weight. The prestressing means which might have to be provided relate to peripheral areas where there is easy access, and cause no signficant installation problems. The space between footing 20 and the confinement enclosure floor 21 can be advantageously occupied by equipment rooms and, through being underground these can house sensitive equipment. Without excessive complications, it also possible to add the second enclosure 36, which can be at a certain distance from the first through the use of outer members 35.

What is claimed is:

1. A nuclear reactor confinement enclosure comprising a foundation and a skirt connected to said foundation, wherein said foundation comprises a horizontal, concrete footing embedded in the ground, and two groups of oblique frusto-conical or planar concrete slabs bearing on said footing and supporting said confinement enclosure, a first group of said slabs being inclined towards the inside of said footing and prestressed slabs of a second group of said slabs being inclined towards the outside of said footing, disposed around and facing the slabs of said first group, and being connected to said skirt.

2. A confinement enclosure according to claim 1, comprising prestressing cables arranged in radiating manner in said slabs inclined towards the outside and in the footing, between the center of said footing and said confinement enclosure.

3. A confinement enclosure according to claim 1, wherein said footing extends outwards beyond a contact perimeter of said footing with said outwardly inclined slabs.

4. A confinement enclosure according to claim 3, further comprising prestressing hoops arranged along said perimeter of said footing.

5. A confinement enclosure according to claim 3, wherein a second enclosure, which surrounds said first enclosure, is placed on said footing.

6. A confinement enclosure according to claim 5, further comprising a group of oblique truncated cone-shaped or planar concrete slabs bearing on said footing and supporting said confinement enclosure, said slabs being inclined towards the inside of said footing and being located around said outwardly inclined slabs.

7. A confinement enclosure according to claim 1, comprising concrete partitions for compartmentalizing into zones or rooms at least part of a space defined by said slabs, said footing and a floor of said confinement enclosure.

8. A confinement enclosure according to claim 1, comprising a shaft located between the slabs of said first group, said shaft being defined by a concrete wall between said footing and said confinement enclosure, open onto said confinement enclosure and containing at least part of a reactor vessel.

* * * * *